United States Patent [19]

Rosenband et al.

[11] Patent Number: 5,895,021
[45] Date of Patent: Apr. 20, 1999

[54] ROTATABLE PLATFORM DISPLAY DEVICE

[75] Inventors: Phillip Rosenband, Hammond; John Fink, Portage, both of Ind.

[73] Assignee: Morgan Marshall Industries, Inc., Chicago Heights, Ill.

[21] Appl. No.: 08/892,616

[22] Filed: Jul. 14, 1997

[51] Int. Cl.⁶ .................................................. A47B 91/00

[52] U.S. Cl. ............................................ 248/349.1; 108/20

[58] Field of Search ................... 464/45; 248/521, 248/522, 349.1; 108/20, 22, 139; 211/163, 1.52, 1.53; 476/25, 15, 67, 33, 31, 57, 58, 12, 13, 64, 20

[56] References Cited

U.S. PATENT DOCUMENTS

| | | | |
|---|---|---|---|
| 1,053,742 | 2/1913 | Osvald | 108/139 X |
| 1,816,102 | 7/1931 | Waters et al. | 108/20 X |
| 2,587,788 | 3/1952 | Tacy | 248/349.1 X |
| 4,890,008 | 12/1989 | Chu | 248/522 X |

*Primary Examiner*—Ramon O. Ramirez
*Attorney, Agent, or Firm*—Laff, Whitesel, Conte & Saret, Ltd.

[57] ABSTRACT

A battery operated, rotatable platform display device for use in retail establishments. The display device employs a friction clutch provided between the base of the rotatable platform and an underlying drive plate upon which the rotatable platform is supported via a rotatable drive shaft.

8 Claims, 2 Drawing Sheets

ROTATABLE PLATFORM DISPLAY DEVICE

BACKGROUND OF THE INVENTION

Rotatable platform display units for retail display purposes in stores are known. Typical rotatable platform display units employ a driven table which is geared to a motor. Most such units are powered directly from a local 110 VAC or 220 VAC power grid and, therefore, lack mobility. Further, typical current turntable drive devices employ complicated positive clutch arrangements and are not readily adaptable to use in mobile rotatable turntable displays. Neither are they adaptable for use when they are required to carry substantial loads and, at the same time, are required to operate safely even when children are likely to be in the vicinity of, and even play with, the display unit.

It would be advantageous to provide a battery-operated rotatable turntable display unit from which the turntable can be easily removed, and with which consumers can come into contact without fear of injury.

SUMMARY OF THE INVENTION

In accordance with the present invention, an improved rotatable platform retail display device which is adapted to be safely operated in the presence of children and which is preferably battery operated is provided.

The rotatable platform display device comprises a support adapted to be floor supported, a motor means mounted on the support, a vertically oriented drive shaft mounted on the support and adapted to be rotated by the motor, a horizontally disposed drive plate secured to the drive shaft at the upper end thereof and having a drive plate surface, and a rotatable platform, the rotatable platform having a horizontally disposed lower surface seated on the drive plate drive surface to form a friction clutch therewith, and wherein the platform is adapted to be driven by the frictional engagement between the drive plate surface and the platform lower surface.

Preferably, the drive plate is a circular drive plate defining a circular drive surface, and the platform lower surface is complementary to, and is seated and solely supported on, the circular drive surface.

In one form of the invention, the motor means comprises an AC motor, a DC storage battery and an inverter, and the inverter converts energy supplied by the storage battery to an AC power supply. In one form, the motor means further comprises a charger for charging the storage battery from an AC power supply.

In a preferred form, the support includes a housing defining an open top overlaid by the rotatable platform. Desirably, the platform is generally circular in plan view, defines a downwardly extending skirt surrounding the open top, and may be easily removed therefrom. The support may include roller means for facilitating movement of the display device along a floor on which it is supported.

Further objects, features and advantages of the present invention will become apparent from the following description and drawings.

DETAILED DESCRIPTION

Figure 1:
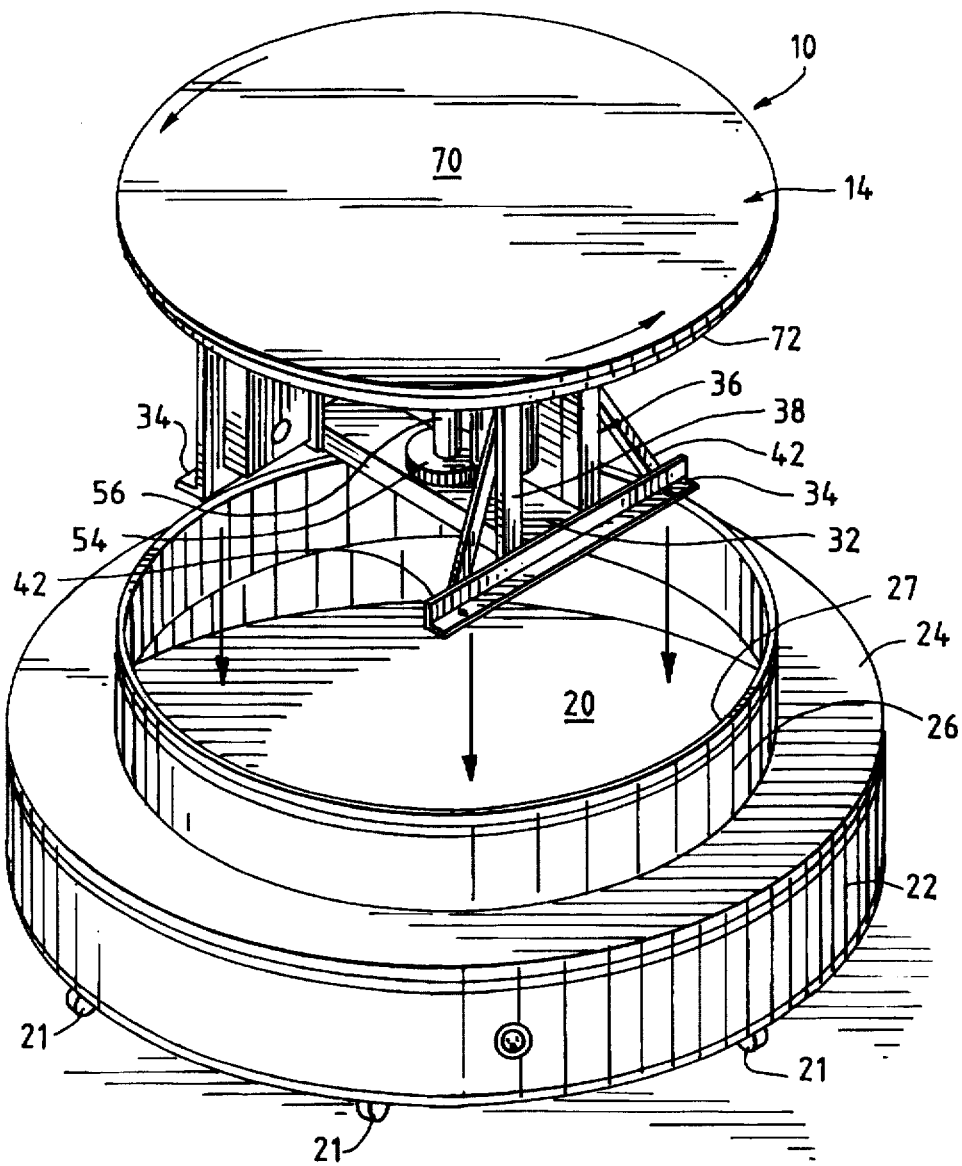
FIG. 1 is an exploded perspective view of a rotating platform display device made in accordance with the present invention.

Referring now to the drawings, a motorized rotating platform retail display device 10 of the present invention is adapted to be floor-supported, such as on a horizontal floor, and is seen to include a support base 12 and a rotatable platform 14. Platform 14 is adapted to be rotated at a selected speed, such as, for example, 1½ rpm by a motor supported on the support base 12. Platform 14 is generally circular in plan view.

Support base 12 comprises a housing which may be generally circular and which may desirably comprise a base or floor 20 supported on a series of appropriately spaced and positioned rollers, such as casters 21, to facilitate movement of the display unit 10 along a floor or other surface from one location to another. Floor 20 may be of plywood, of metal, or of a suitable combination which will adequately support the platform 14 and the associated support structure. Support base 12 may further comprise an outer enclosing vertical wall 22, a horizontal annular shelf 24 extending inwardly at the top of wall 22, and a further upstanding sleeve 26 extending upwardly from the inner edge of shelf 24. Sleeve 26 is circular in plan view and defines a central opening 27.

In a preferred form, the support base is about 6½ feet in diameter. The vertical wall is about one foot high and the sleeve 26 is also about one foot high. The inner diameter of the sleeve is about four feet.

Figure 2:
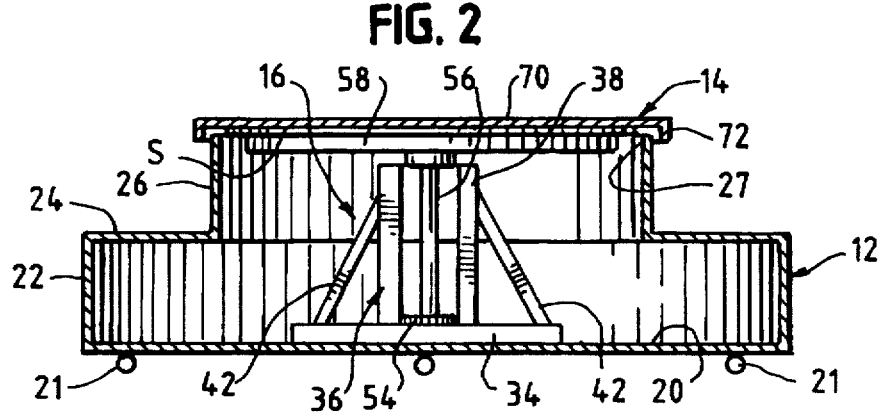
FIG. 2 is a partial, cross-sectional view of the display device of FIG. 1 taken substantially along a vertical, diametric plane of the display device as assembled.
Figure 3:
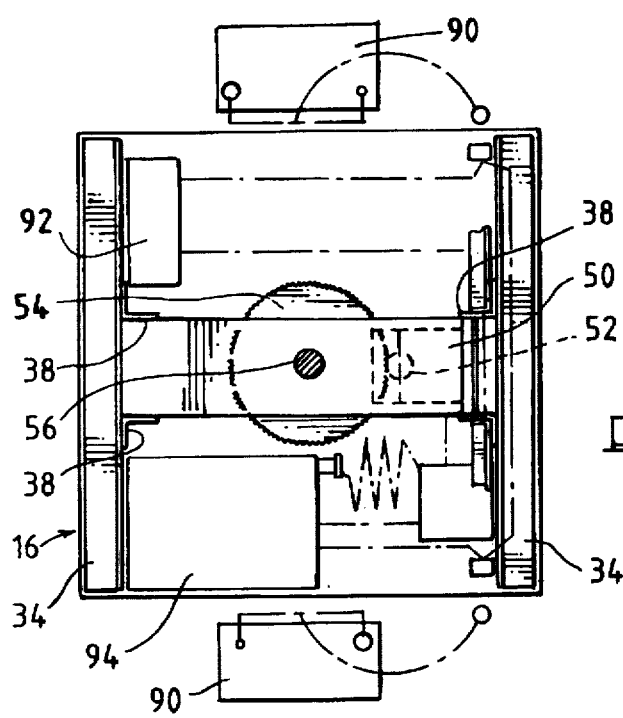
FIG. 3 is a plan view of the motor assembly of FIG. 1.
Figure 4:
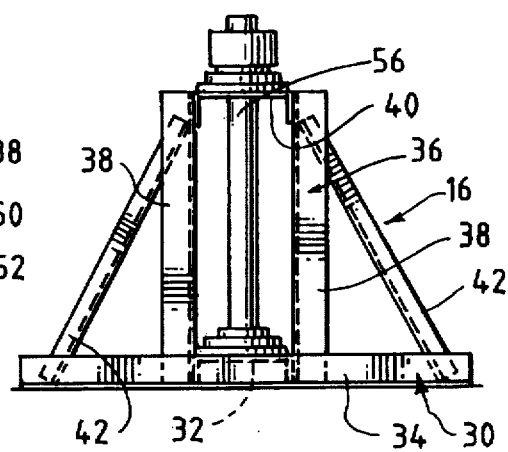
FIG. 4 is a side elevational view of the motor assembly of FIG. 3.
Figure 5:
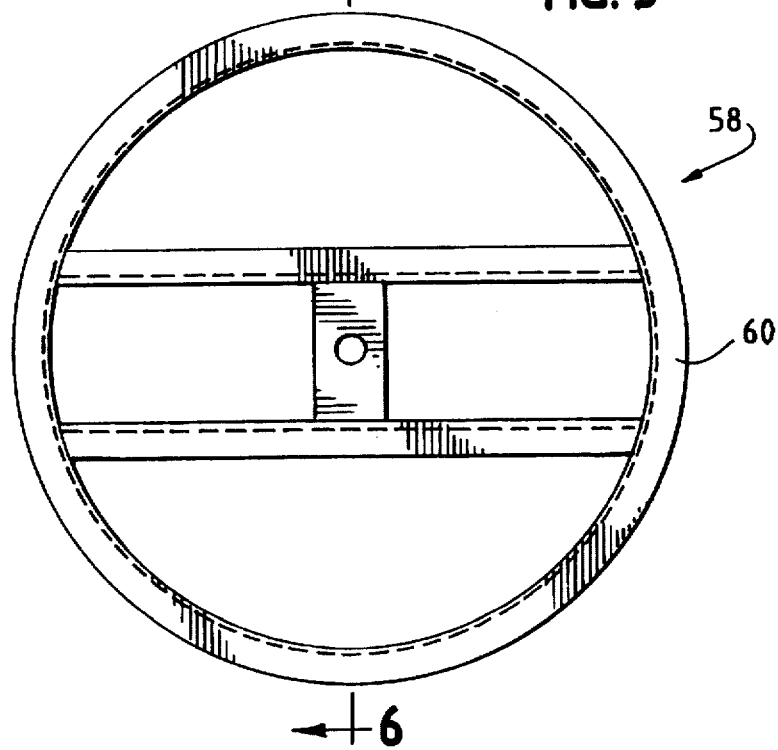
FIG. 5 is a plan view of the drive ring of the display device of FIG. 1.
Figure 6:
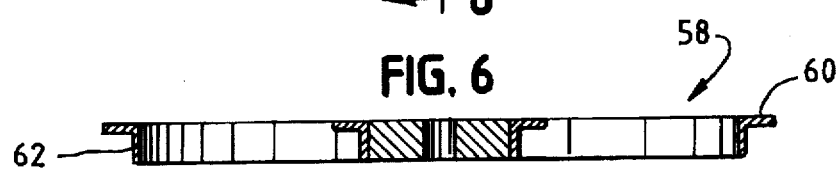
FIG. 6 is a side elevational view of FIG. 5.

Support base 12 mounts a motor assembly 16 which, in turn, supports the platform 14. Motor assembly 16 comprises a frame 30 which may include a central base plate 32 and a pair of stabilizing supports 34. Supports 34 extend outwardly from the base plate 32 and may comprise L-shaped angle irons which are suitably secured to the base plate as by welding or by fasteners. Supports 34 define openings 35 (see FIG. 2) for fasteners such as screws (not shown) for securing the frame 30 to the floor 20 of support base 12. Frame 30 further includes laterally spaced vertical legs 36 which extend upwardly from the base plate 32 at each of the ends of the central base plate 32. Legs 36 may comprise pairs of adjacent leg members 38. At their tops, legs 36 are secured to a horizontally disposed upper frame member 40. The several members are fixedly secured as by welding or by suitable fasteners. Stabilization, as needed, may be provided as by angled braces 42 which are secured as by welds at their tops and bottoms, respectively, to the upper portions of leg members 38 and to the stabilizing supports 34.

The frame 30 of the motor assembly 16 further supports a motor such as a gear motor 50. Gear motor 50 may be secured to the central base plate 32. The output of gear motor 50 is a drive gear 52 which engages a driven gear 54. Driven gear 54 is mounted with a vertically oriented drive shaft 56 which is suitably journalled on the frame 30 adjacent base plate 32 and on upper frame member 40. Adjacent its upper end or top, drive shaft 56 is fixedly secured as by welding to a drive plate such as a horizontal disposed circular drive ring 58. Thus, as gear motor 50 is driven, drive ring 58 is driven and rotates with driven gear 54.

The drive ring 58 desirably comprises a generally circular annular drive plate 60 which has a downwardly projecting reinforcing leg 62. It also includes a transverse support plate 64 which is fastened thereto as by welding. At the center of the support plate 64 (the center of drive ring 58), drive shaft 56 is fixedly secured as by welding the shaft to the plate 64. Desirably, the drive ring 58 is located generally at the elevation of the upper edge of the sleeve 26 within the central opening 27 in the support base 12. Drive ring 60 may have an outer diameter of 38 inches and an inner diameter of 33 inches, and may be fabricated of steel.

The platform 14 itself preferably comprises a planar plate 70, as of metal or a suitably hard wooden construction, with a downwardly extending skirt 72. The diameter of skirt 72 is greater than the diameter of the drive ring 58 and preferably is also greater in diameter than the outer diameter of the circular sleeve 26. In that manner, the platform 14 serves to overlay and cover the open top of the housing (the central opening 27), and thereby serves to mask the drive ring and upper end of the sleeve from view.

In a preferred form, the platform 14 simply rests upon the drive ring 58 and, therefore, rotates due to the frictional engagement between the horizontally disposed lower surface S of the platform plate 70 and the circular upper plate drive surface 60. The frictional engagement of the friction clutch thus provided between the complementary surface S and the drive plate surface assures rotation of the platform 14 under normal circumstances. However, if the platform is restrained for some reason while the drive ring 58 is being driven by the gear motor 50, because of the absence of positive engagement between drive ring 58 and the platform surface S, slippage will occur and potential damage to the display device or potential injury to users will be avoided. The platform 14 is easily removed by lifting it from the drive ring 58.

Thus, it is clear that the platform 14 is supported entirely on the drive shaft 56 via the circular drive surface 60. The drive ring 58 and platform 14 arrangement themselves, forms a friction clutch.

In accordance with the present invention, the gear motor 50 may be a motor such as a 9 rpm gear motor manufactured by Bodine. It is adapted to be powered by a storage battery 90 via a 12 VDC to 115 VAC inverter 94, which converts energy supplied by the storage battery to an AC power supply. The motor may also be driven directly from a 115 VAC outside power supply. The electrical system may be set up so that the battery or batteries continuously charge while the system is operating directly from an AC power supply. The battery may be charged from an AC powered charger 94 for charging the storage battery directly from an AC power supply. The gear motor 50, battery 90 and inverter 94, together with the cabling connecting them, may be mounted on the motor assembly 16. To assure continuous power for extended usage, two batteries are connected together as one battery bank. Batteries 90 are preferably sealed gel batteries.

Thus, it will be appreciated that a rotatable platform display device, especially usable in retail environments, is provided in accordance herewith. The display device is readily adapted for easy movement from one location to another. It is adapted to mount retail displays, such as clothing, in retail establishments. It provides a friction clutch which will slip when a person grasps the rotating platform, despite the fact that they are not supposed to do so. The platform is easily removed simply by lifting it off of the drive means. Finally, the structure is battery operated, is easily recharged, and simply constructed, making it ideal for use in retail environments.

It will be apparent to those skilled in the art that further modifications in the embodiment may be made without departing from the spirit and scope of the invention. Accordingly, we do not intend the invention to be limited except as may be made necessary by the appended claims.

What is claimed is:

1. A rotatable platform display device comprising:

a support adapted to be floor supported;

a motor means mounted on the support;

a vertically oriented drive shaft mounted on the support and adapted to be rotated by the motor means, a horizontally disposed drive plate secured to the drive shaft at the upper end thereof and having a drive surface; and a rotatable platform, said platform having a horizontally disposed lower surface seated on said drive plate drive surface to form a friction clutch therebetween, and wherein said platform is adapted to be driven by the frictional engagement between said drive plate surface and said platform lower surface.

2. A rotatable platform display device in accordance with claim 1, wherein said drive plate is a circular drive plate defining a circular drive surface and said platform lower surface is complementary to said circular drive surface, and is seated and supported solely on said circular drive surface.

3. A rotatable platform display device in accordance with claim 1, and wherein said motor means comprises an AC motor, a DC storage battery and an inverter, and wherein said inverter converts energy supplied by said storage battery to an AC power supply.

4. A rotatable platform display device in accordance with claim 3, and wherein said motor assembly further comprises a charger for charging said storage battery from an AC power supply.

5. A rotatable platform display device in accordance with claim 1, and wherein said support includes a housing defining an open top overlaid by said rotatable platform.

6. A rotatable platform display device in accordance with claim 5, and wherein said platform is generally circular in plan view and defines a downwardly extending skirt surrounding said open top.

7. A rotatable platform display device in accordance with claim 5, and wherein said support includes roller means for facilitating movement of said display device along a floor on which it is supported.

8. A rotatable platform display device in accordance with claim 1, and wherein said rotatable platform is supported via said drive shaft on said drive plate, and is removable by lifting it therefrom.

* * * * *